US011407256B2

(12) United States Patent
Arai (10) Patent No.: US 11,407,256 B2
(45) Date of Patent: Aug. 9, 2022

(54) TYRE

(71) Applicant: Sumitomo Rubber Industries, Ltd., Kobe (JP)

(72) Inventor: Hiroshi Arai, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 321 days.

(21) Appl. No.: 16/838,569

(22) Filed: Apr. 2, 2020

(65) Prior Publication Data

US 2020/0361244 A1   Nov. 19, 2020

(30) Foreign Application Priority Data

May 14, 2019 (JP) .............................. JP2019-091582

(51) Int. Cl.
*B60C 11/12* (2006.01)
*B60C 11/03* (2006.01)

(52) U.S. Cl.
CPC .......... *B60C 11/12* (2013.01); *B60C 11/0304* (2013.01); *B60C 11/0306* (2013.01); *B60C 2011/0341* (2013.01); *B60C 2011/0365* (2013.01)

(58) Field of Classification Search
CPC ................. B60C 11/12; B60C 11/0306; B60C 2011/0341; B60C 2011/0365
See application file for complete search history.

(56) References Cited

U.S. PATENT DOCUMENTS

| 5,492,161 A * | 2/1996 | Fuchikami .......... B60C 11/0316 152/DIG. 3 |
| 2008/0053585 A1* | 3/2008 | Ohara ................... B60C 11/125 152/209.25 |
| 2010/0154951 A1* | 6/2010 | Honbou .............. B60C 11/1263 152/209.18 |

(Continued)

FOREIGN PATENT DOCUMENTS

| EP | 3 025 874 A1 | 6/2016 |
| EP | 3 031 626 A1 | 6/2016 |

(Continued)

OTHER PUBLICATIONS

Extended European Search Report for European Application No. 20169250.6, dated Aug. 3, 2020.

*Primary Examiner* — Yung-Sheng M Tsui
(74) *Attorney, Agent, or Firm* — Birch, Stewart, Kolasch & Birch, LLP (57) ABSTRACT

A tyre includes a tread portion including a crown land portion defined between two main grooves extending continuously in a tyre circumferential direction. The crown land portion is provided with crown lateral grooves traversing the crown land portion. Each of the crown lateral grooves, in a cross-sectional view perpendicular to its longitudinal direction, includes a sipe portion having a width equal to or less than 1.5 mm, and a main portion connected to the sipe portion and opening at a ground contact surface of the crown land portion. The main portion has a width enlarging from the sipe portion. The main portion has a depth smaller than depths of the main grooves. The sipe portion has a first wall extending in a tyre radial direction so as to be continuous with a first wall of the main portion to form a single groove wall together.

18 Claims, 6 Drawing Sheets

(56) References Cited

U.S. PATENT DOCUMENTS

| | | | |
|---|---|---|---|
| 2012/0318419 A1* | 12/2012 | Iwabuchi | B60C 11/0304 |
| | | | 152/209.8 |
| 2013/0075001 A1* | 3/2013 | Yasunaga | B60C 11/1272 |
| | | | 152/209.8 |
| 2015/0191052 A1* | 7/2015 | Okabe | B60C 11/1369 |
| | | | 152/209.18 |
| 2016/0144668 A1* | 5/2016 | Oba | B60C 11/1236 |
| | | | 152/209.25 |
| 2017/0267031 A1* | 9/2017 | Oba | B60C 11/0083 |
| 2018/0015786 A1* | 1/2018 | Oji | B60C 11/045 |
| 2018/0015790 A1* | 1/2018 | Oji | B60C 11/047 |
| 2018/0079261 A1* | 3/2018 | Kujime | B60C 11/1236 |
| 2018/0312009 A1* | 11/2018 | Wada | B60C 11/1376 |
| 2019/0160878 A1* | 5/2019 | Wakasugi | B60C 11/1204 |
| 2019/0160879 A1* | 5/2019 | Arai | B60C 11/0304 |
| 2020/0376895 A1* | 12/2020 | Hamanaka | B60C 11/0306 |

FOREIGN PATENT DOCUMENTS

| | | |
|---|---|---|
| EP | 3 088 213 A1 | 11/2016 |
| EP | 3 263 367 A1 | 1/2018 |
| EP | 3 342 605 A1 | 7/2018 |
| JP | 2018-1976 A | 1/2018 |

\* cited by examiner

Comparative example

TYRE

BACKGROUND ART

Field of the Disclosure

The present disclosure relates to tyres suitable for driving on snow.

Description of the Related Art

The following Patent document 1 discloses a pneumatic tyre which is suitable for driving on snow. The pneumatic tyre includes a tread portion provided with crown lateral grooves with groove bottom sipes which are opened at the groove bottoms. The groove bottom sipes can prevent the crown lateral grooves from being stuffed with snow.

PATENT DOCUMENT

[Patent document 1] Japanese Unexamined Patent Application Publication 2018-001976

SUMMARY OF THE DISCLOSURE

Recent years, further improvement in on-snow performance has been required. On the other hand, increasing the depth of the crown lateral grooves to improve on-snow performance tends to decrease wear resistance of the land portion.

The present disclosure has been made in view of the above circumstances and has a major object to provide a tyre capable of improving on-snow performance while preventing reduction in wear resistance.

In one aspect of the present disclosure, a tyre includes a tread portion including at least one crown land portion defined between two main grooves extending continuously in a tyre circumferential direction, the at least one crown land portion being provided with crown lateral grooves traversing the at least one crown land portion, each of the crown lateral grooves, in a cross-sectional view perpendicular to its longitudinal direction, including a sipe portion having a width equal to or less than 1.5 mm, and a main portion connected to the sipe portion and opening at a ground contact surface of the at least one crown land portion, wherein the main portion has a width enlarging from the sipe portion, the main portion has a depth smaller than depths of the main grooves, and the sipe portion has a first wall extending in a tyre radial direction so as to be continuous with a first wall of the main portion to form a single groove wall together.

In another aspect of the present disclosure, the main grooves may include a crown main groove located on a tyre equator side with respect to the at least one crown land portion, the crown main groove may include first groove elements inclined with respect to the tyre circumferential direction, and second groove elements inclined with respect to the tyre circumferential direction at a greater angle than that of the first groove elements, and the first groove elements and the second groove elements may be alternated in the tyre circumferential direction.

In another aspect of the present disclosure, the crown lateral grooves may be connected to the respective second groove elements.

In another aspect of the present disclosure, the first wall of the main portion of each of the crown lateral grooves may be connected to a groove wall of a respective one of the second groove elements, and the first wall of the main portion of each of the crown lateral grooves, with respect to the tyre axial direction, may extend at a different angle from an angle of a respective one of the second groove elements.

In another aspect of the present disclosure, the crown main groove may be provided with partial tie-bars in which bottoms thereof raise partially, the partial tie-bars may be connected to the at least one crown land portion, and the partial tie-bars may be provided on end portions in the tyre circumferential direction of the respective first groove elements.

In another aspect of the present disclosure, the at least one crown land portion may be provided with crown sipes extending from the crown main groove, and a minimum distance between a respective one of the partial tie-bars and a respective one of the crown sipes which are adjacent with one another, in a plan view of the tread portion, may be equal to or less than 2.0 mm.

In another aspect of the present disclosure, a maximum depth of the crown lateral grooves may be in a range of from 0.80 to 1.00 times a depth of the crown main groove.

In another aspect of the present disclosure, the at least one crown land portion may include two crown land portions.

In another aspect of the present disclosure, one of the crown land portions may be provided with the crown lateral grooves each having the sipe portion on a first side in the tyre circumferential direction with respect to a groove centerline thereof, and the other one of the crown land portions may be provided with the crown lateral grooves each having the sipe portion on a second side opposite the first side in the tyre circumferential direction with respect to a groove centerline thereof.

DESCRIPTION OF THE PREFERRED EMBODIMENTS

An embodiment of the present disclosure will be explained below with reference to the accompanying drawings.

Figure 1:
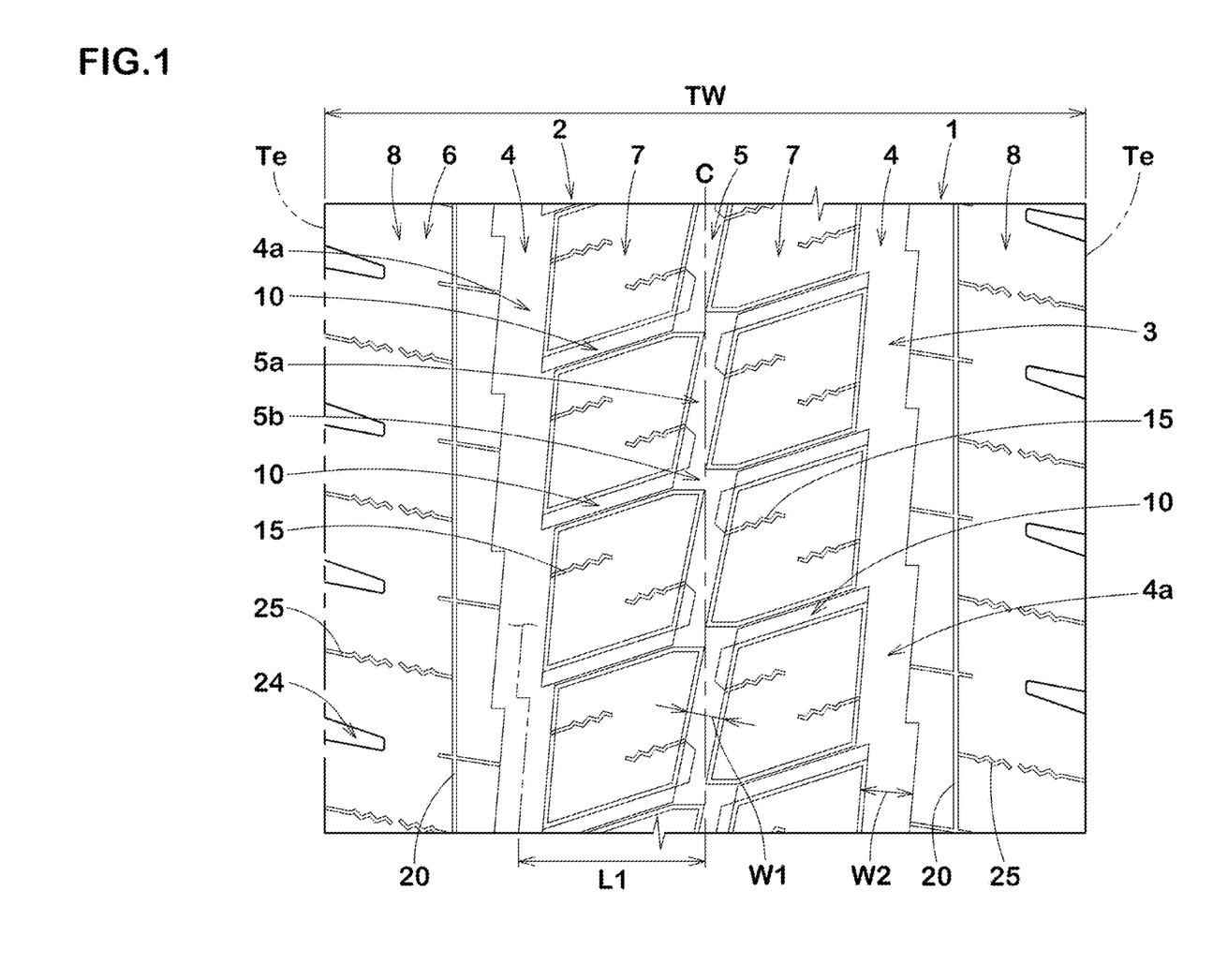
FIG. 1 is a development view of a tread portion of a tyre in accordance with an embodiment of the disclosure.

FIG. 1 illustrates a development view of a tread portion 2 of a tyre 1 in accordance with an embodiment of the disclosure.

The tyre 1 according to the present embodiment, for example, may preferably be used for a pneumatic tyre for passenger car. Additionally, the tyre 1 according to the present embodiment is not designated by neither a mounting direction to a vehicle nor rotational direction thereof. Thus, the tyre 1 has a point symmetrical tread pattern with respect to a point on the tyre equator C. Note that the tyre 1 according to the present disclosure is not particularly limited to such an aspect of use.

As illustrated in FIG. 1, the tread portion 2 of the tyre 1 is provided with main grooves 3 extending continuously in the tyre circumferential direction.

The main grooves 3, for example, include two shoulder main grooves 4 and one crown main groove 5 disposed between the shoulder main grooves 4. Each of the shoulder main grooves 4, for example, is arranged between the tyre equator C and a respective one of the tread edges Te. In the present embodiment, the crown main groove 5 is arranged between the shoulder main grooves 4 on the tyre equator C.

When the tyre 1 is a pneumatic tyre, the tread edges Te are defined as axially outermost edges of the ground contacting patch of the tread portion 2 which occurs under a normal state with a standard tyre load when the camber angle of the tyre is zero. As used herein, the normal state is such that the tyre is mounted on a standard wheel rim with a standard pressure but loaded with no tyre load.

As used herein, the standard wheel rim is a wheel rim officially approved for each tyre by standards organizations on which the tyre is based, wherein the standard wheel rim is the "standard rim" specified in JATMA, the "Design Rim" in TRA, and the "Measuring Rim" in ETRTO, for example.

As used herein, the standard pressure is a standard pressure officially approved for each tyre by standards organizations on which the tyre is based, wherein the standard pressure is the "maximum air pressure" in JATMA, the maximum pressure given in the "Tyre Load Limits at Various Cold Inflation Pressures" table in TRA, and the "Inflation Pressure" in ETRTO, for example.

As used herein, the standard tyre load is a tyre load officially approved for each tyre by standards organizations in which the tyre is based, wherein the standard tyre load is the "maximum load capacity" in JATMA, the maximum value given in the above-mentioned table in TRA, the "Load Capacity" in ETRTO, for example.

Preferably, a distance L1 in the tyre axial direction from the tyre equator C to a respective one of the shoulder main groove centerlines, for example, is in a range of 0.20 to 0.30 times the tread width TW. The tread width TW is a distance in the tyre axial direction between the tread edges Te of the tyre 1 under the normal state.

Preferably, groove widths W1 and W2 of the crown main groove 5 and the shoulder main grooves 4, respectively, are in a range of 4% to 7% of the tread width TW, for example. Preferably, depths of the main grooves, for example, are in a range of 5 to 10 mm. More preferably, the groove width W2 of the shoulder main grooves 4 may be greater than the groove width W1 of the crown main groove 5. This may improve wear resistance and on-snow performance in a well-balanced manner.

The crown main groove 5 extends in a zigzag manner in the tyre circumferential direction. The crown main groove 5 according to the present embodiment includes first groove elements 5a inclined with respect to the tyre circumferential direction, and second groove elements 5b inclined with respect to the tyre circumferential direction at a greater angle than that of the first groove elements 5a. The first groove elements 5a and the second groove elements 5b are alternated in the tyre circumferential direction. Preferably, an angle of the first groove elements 5a, for example, is in a range of 5 to 15 degrees with respect to the tyre circumferential direction. Preferably, an angle of the second groove elements 5b, for example, is in a range of 80 to 90 degrees with respect to the tyre circumferential direction. The crown main groove 5 as such can help to improve snow traction.

Each of the shoulder main grooves 4, for example, includes a plurality of inclined elements 4a arranged in the tyre circumferential direction. Each of the inclined elements 4a is inclined at an angle equal to or less than 10 degrees with respect to the tyre circumferential direction. The inclined elements 4a adjacent to one another in the tyre circumferential direction are coupled together so as to form a pair of zigzag groove edges. In some preferred embodiments, the angle of the inclined elements 4a of the shoulder main grooves 4 with respect to the tyre circumferential direction is smaller than the angle of the first groove elements 5a of the crown main groove 5 with respect to the tyre circumferential direction. This structure may be helpful to uniform wear of the crown main groove 5 and the shoulder main grooves 4, improving uneven wear resistance.

The tread portion 2 includes a plurality of land portions 6 which is divided by the main grooves 3. The tread portion 2 according to the present embodiment, for example, includes four land portions 6 divided by three main grooves 3 as described above. Note that the present disclosure is not particularly limited but can be modified in such a manner that the tread portion 2, for example, may include five or more land portions 6 divided by four or more main grooves 3.

The tread portion 2 includes two crown land portion 7 and two the shoulder land portions 8. In the present embodiment, the land portions consist of two crown land portion 7 and two the shoulder land portions 8. Each crown land portion is defined between two main grooves 3, e.g., between the crown main groove 5 and a respective one of the shoulder main grooves 4 in the present embodiment. The shoulder land portions 8 are defined between the shoulder main grooves 4 and the tread edges Te.

Figure 2:
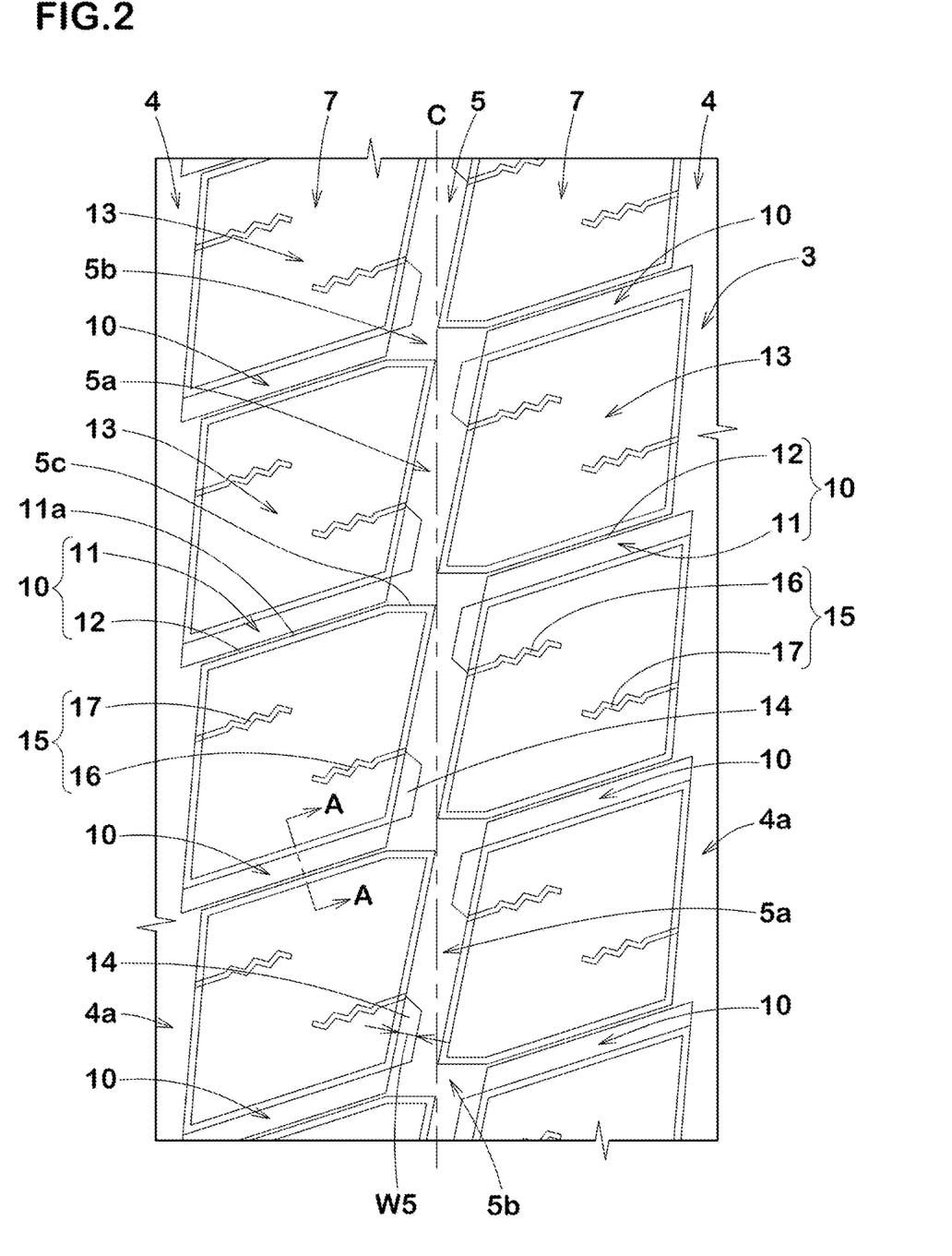
FIG. 2 is an enlarged view of crown land portions of FIG. 1.

FIG. 2 illustrates an enlarged view of the crown land portions 7. As illustrated in FIG. 2, each crown land portion 7 is provided with a plurality of crown lateral grooves 10 traversing the crown land portion. Thus, each crown land portion 7 is divided into a plurality of crown blocks 13.

Figure 3:
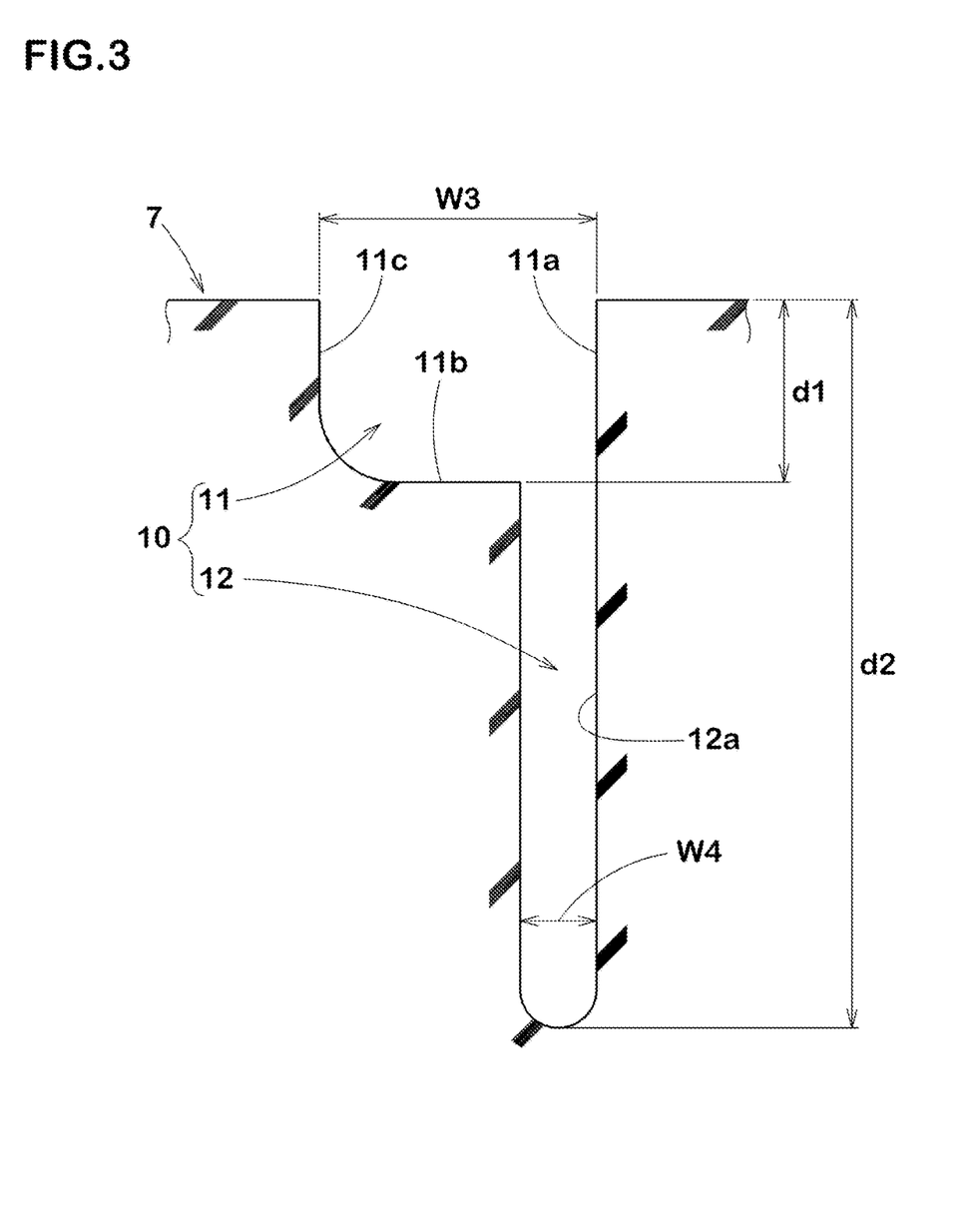
FIG. 3 is a cross-sectional view taken along line A-A of FIG. 2.

FIG. 3 illustrates a cross-sectional view of one of the crown lateral grooves 10 taken along line A-A of FIG. 2. As illustrated in FIG. 3, each of the crown lateral grooves 10, in a cross-sectional view perpendicular to its longitudinal direction, includes a sipe portion 12 having a width W4 equal to or less than 1.5 mm, and a main portion 11 connected to the sipe portion 12 and opening at a ground contact surface of the crown land portion 7. The main portion 11 has a width enlarging from the sipe portion 12. The main portion 11 has a depth d1 smaller than depths of the main grooves 3. Additionally, the sipe portion 12 has a first wall 12a extending in the tyre radial direction so as to be continuous with a first wall 11a of the main portion 11 to form a single groove wall (e.g., a flatted groove wall) together.

The sipe portion 12 has s small width that is capable of closing upon grounding, thus preventing excessive reduction in stiffness of the crown land portion 7. Further, the main portion 11 has a smaller depth than that of the main grooves 3, preventing reduction in stiffness of the crown land portion 7. Accordingly, reduction of wear resistance of the crown land portion 7 due to reduction in stiffness by the crown lateral grooves 10 can be prevented.

The crown lateral grooves 10 can provide reaction force (snow-column shearing force) by compacting and shearing snow when driving on snow, improving on-snow performance. Further, since the crown lateral grooves 10 according to the present disclosure each are configured such that the first wall 12a of the sipe portion 12 extending in the tyre radial direction is continuous with the first wall 11a of the main portion 11 to form a single groove wall, each sipe portion 12 can open each crown lateral groove 10 sufficiently wide upon a groove edge of each crown lateral groove 10 receives shearing force in the tyre circumferential direction. Thus, the difference between the volume when the crown lateral grooves 10 are opened and the volume when the crown lateral grooves 10 are closed increases. Accordingly, when driving on snow, the crown lateral grooves 10 can capture more snow and compress it strongly, providing a large snow-column shearing force and improving on-snow performance.

As illustrated in FIG. 2, preferably, the crown lateral grooves 10 are connected to the respective second groove elements 5b of the crown main groove 5. Additionally, the crown lateral grooves 10 are preferably connected to the respective connected portions between the adjacent two inclined elements 4a of the shoulder main groove 4. Such crown lateral grooves 10, when driving on snow, can form firm snow columns at the respective connected portions of the main grooves, improving on-snow performance.

The main portion 11 of each crown lateral groove 10, for example, is inclined with respect to the tyre axial direction. It is preferable that the main portion 11, with respect to the tyre axial direction, is inclined in an opposite direction to a direction of each second groove element 5b of the crown main groove 5. In each crown lateral groove 10, the first wall 11a of the main portion 11 is connected to a groove wall 5c of a respective one of the second groove elements 5b, and the first wall 11a of the main portion 11, with respect to the tyre axial direction, extends at a different angle from an angle of the groove wall 5c of a respective one of the second groove elements 5b. Thus, when driving on snow, connected portions between the crown lateral grooves 10 and the second groove elements 5b can form firm snow columns.

Preferably, an angle of each main portion 11 with respect to the tyre axial direction is greater than an angle of each second groove element 5b with respect to the tyre axial direction. More specifically, the angle of crown lateral grooves 10 is in a range from 15 to 25 degrees with respect to the tyre axial direction. Such crown lateral grooves 10 can improve traction and cornering performance on snow.

As illustrated in FIG. 3, each main portion 11 includes the first wall 11a extending along (e.g., parallel with) the tyre radial direction from the sipe portion 12, a bottom 11b extending from the sipe portion 12 in parallel with a ground contact surface of the crown land portion 7, and a second wall 11c connected to the bottom 11b. Note that the structure of the main portion 11 is not limited to such an aspect, but can be modified such that the main portion 11, for example, includes the first wall 11a extending along (e.g., parallel with) the tyre radial direction and an oblique wall (not illustrated) extending obliquely from the sipe portion 12.

For example, an opening width W3 of each main portion 11 is preferably smaller than a groove width W1 of the crown main groove 5 (shown in FIG. 1). More specifically, the opening width W3 of each main portion 11 is preferably in a range from 0.50 to 0.80 times the groove width W1 of the crown main groove 5, more preferably in a range from 0.60 to 0.70 times. Such a main portion 11 can help to improve wear resistance and on-snow performance in a well-balanced manner.

In the same viewpoint, the depth d1 of each main portion 11, for example, is preferably in a range from 0.25 to 0.60 times a depth of the crown main groove 5.

Each sipe portion 12, for example, extends in the tyre radial direction with a constant width. For example, the width W4 of each sipe portion 12 is in a range from 0.5 to 1.5 mm, more preferably from 0.8 to 1.2 mm.

For example, the maximum depth d2 of each crown lateral groove 10 is preferably equal to or greater than 0.70 times the depth of the crown main groove 5, more preferably equal to or greater than 0.80 times, but preferably equal to or less than 1.10 times, more preferably equal to or less than 1.00 times. Thus, superior on-snow performance can be obtained. Note that the above-mentioned maximum depth d2 corresponds to a depth from a ground contact surface of the land portion to the bottom of the sipe portion 12.

Figure 4:
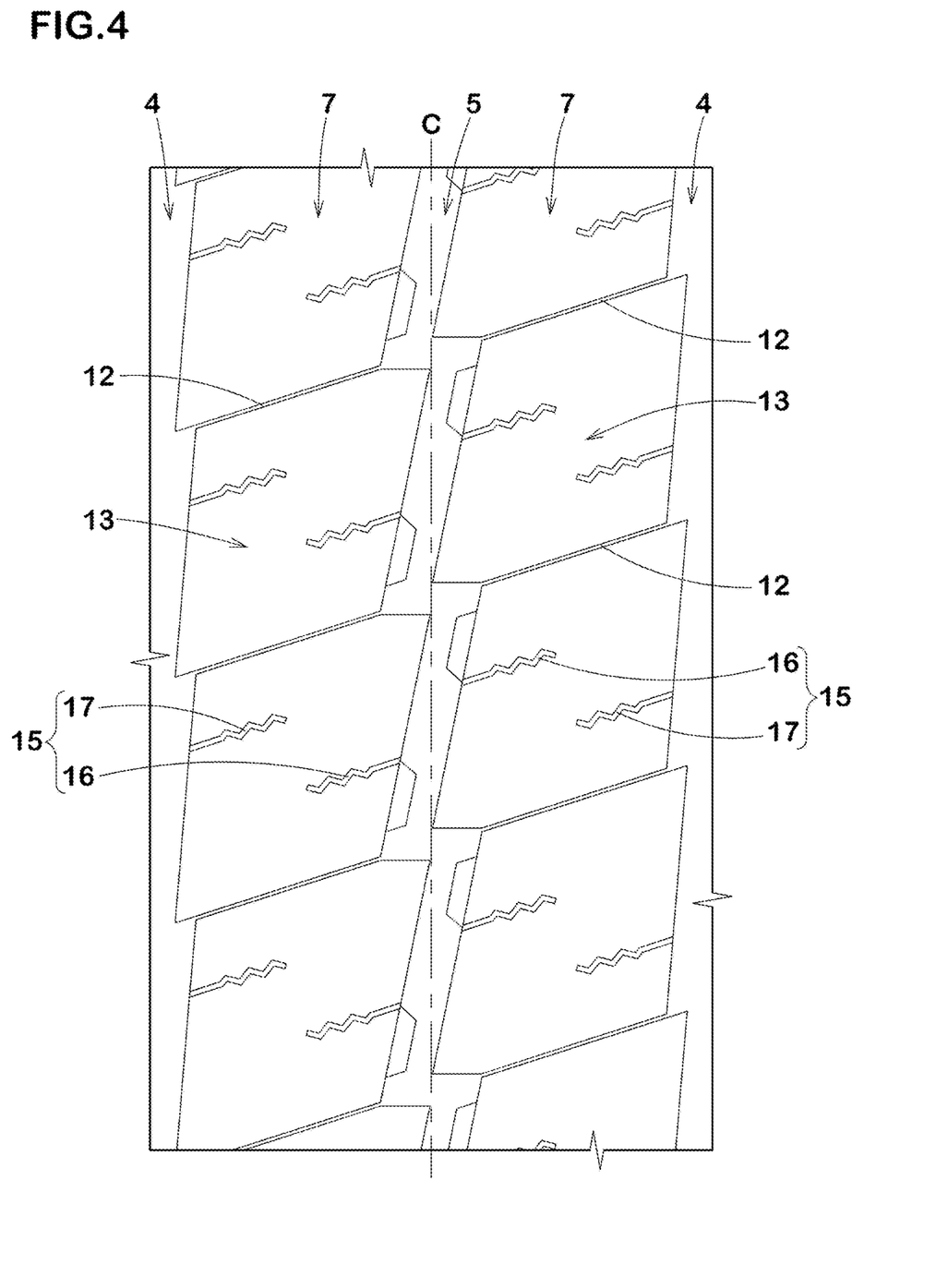
FIG. 4 is an enlarged view of the crown land portions after wearing.

FIG. 4 illustrates an enlarged view of the crown land portions 7 after the main portions 11 of the crown lateral grooves 10 worn. As illustrated in FIG. 4, in the crown land portions 7, after the main portions 11 worn out, the sipe portions 12 still remain on the ground contact surface so as to provide friction by the edges.

As illustrated in FIG. 2, in the present embodiment, one of the crown land portions 7 is provided with the crown lateral grooves 10 each having the sipe portion 12 on a first side in the tyre circumferential direction with respect to a groove centerline thereof. Further, the other one of the crown land portions is provided with the crown lateral grooves 10 each having the sipe portion 12 on a second side opposite the first side in the tyre circumferential direction with respect to a groove centerline thereof. Such an arrangement of the sipe portions 12 can help to prevent uneven wear of the crown land portions 7.

The crown main groove 5, for example, is provided with partial tie-bars 14 in which bottoms thereof raise partially. The partial tie-bars 14 are connected to either one of the crown land portions 7, for example. In the present embodiment, the partial tie-bars 14 are provided in a staggered manner such that the partial tie-bars 14, in the tyre circumferential direction, appear alternatively either side of the groove walls of the crown main groove 5. Preferably, the partial tie-bars 14 are provided on end portions in the tyre circumferential direction of the respective first groove elements 5a. Such partial tie-bars 14, when driving on snow, can help to form firm snow columns around the second groove elements 5b, improving on-snow performance.

For example, each of the partial tie-bars 14 preferably has a maximum length which is measured along a longitudinal direction of the respective one of the first groove elements 5a greater than the groove width W1 of the crown main groove 5. Further, the maximum length is preferably in a range from 0.10 to 0.50 times the length of the respective one of the first groove elements 5a. Furthermore, in each of the partial tie-bars 14, it is preferable that a length which is measured along the longitudinal direction of the respective one of the first groove elements 5a decreases gradually toward the groove centerline of the respective one of the first groove elements 5a.

A width W5 of the partial tie-bars 14 which is measured parallel to a width direction of the first groove elements 5a, for example, is preferably in a range from 0.20 to 0.40 times the groove width W1 of the crown main groove 5. A height of the partial tie-bars from a bottom of the crown main groove 5, for example, is preferably in a range of from 0.10 to 0.50 times a maximum depth of the crown main groove 5. Such partial tie-bars 14, while maintaining drainage performance of the crown main groove 5, can exert the above-mentioned effect.

It is preferable that the crown land portion 7, for example, is provided with a plurality of crown sipes 15. The plurality of crown sipes 15, for example, extends from the crown main groove 5 or the respective shoulder main grooves 4, and terminates within the crown land portion 7. The crown sipes 15 configured as such can generate friction force using its edges while preventing uneven wear of the crown land portion 7. As used herein, "sipe" shall mean a narrow cut or incision that has a width equal to or less than 1.5 mm.

It is preferable that the crown sipes 15, for example, are inclined in the same direction as that of the crown lateral grooves 10. Additionally, each of the crown sipes 15 preferably includes a portion extending in a zigzag manner, for example.

The crown sipes 15, for example, includes first crown sipes 16 extending from the crown main groove 5, and second crown sipes 17 extending from the respective shoulder main grooves 4. Preferably, the first crown sipes 16 and the second crown sipes 17 are arranged in a staggered manner in the tyre circumferential direction.

It is preferable that a minimum distance between a respective one of the partial tie-bars 14 and a respective one of the first crown sipes 16 which are adjacent with one another, in a plan view of the tread portion 2, is equal to or less than 2.0 mm. Such an arrangement of the first crown sipes 16 can make the movement of partial tie-bars 14 easy, which helps to form firm snow columns in the crown main grooves 5. In the present embodiment, the crown sipes 15 (the first crown sipes 16) extend from corners formed between the crown land portion 7 and the respective partial tie-bars 14.

Figure 5:
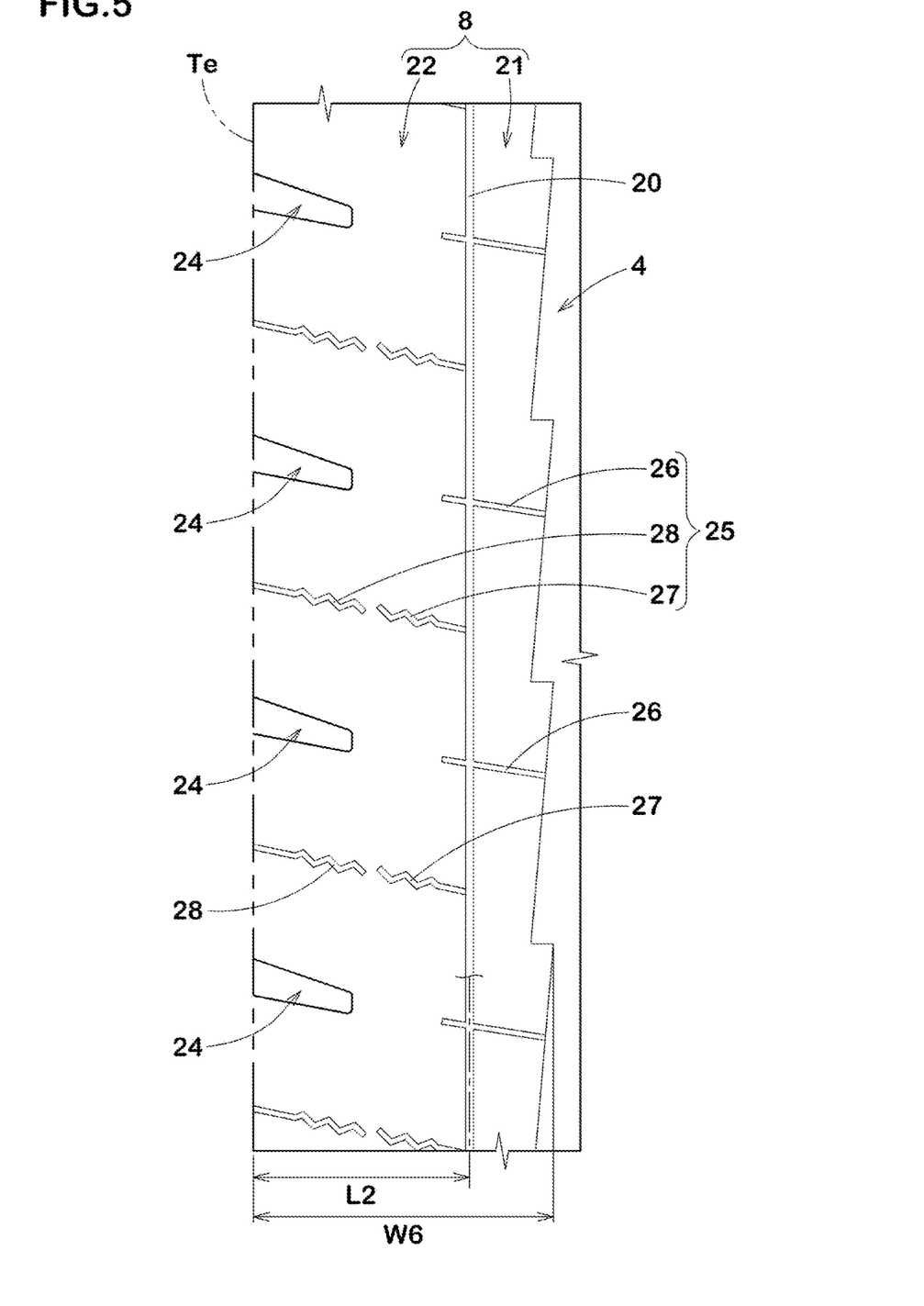
FIG. 5 is an enlarged view of a shoulder land portion of FIG. 1.

FIG. 5 illustrates an enlarged view of one of the shoulder land portions 8. As illustrated in FIG. 5, each of the shoulder land portions 8 according to the present embodiment, for example, is provided with a single longitudinal narrow groove 20 extending continuously in the tyre circumferential direction. Thus, each of the shoulder land portions 8 is divided into a first land portion 21 disposed between the shoulder main groove 4 and the longitudinal narrow groove 20, and a second land portion 22 disposed between the longitudinal narrow groove 20 and the tread edge Te.

It is preferable that the longitudinal narrow groove 20 has a groove width ranging from 1.0 to 2.0 mm, for example. Further, the longitudinal narrow groove 20, for example, is preferably arranged on the shoulder main groove side with respect to the center location of the shoulder land portion 8 in the tyre axial direction. Preferably, a distance L2 in the tyre axial direction from the tread edge Te to the groove centerline of the longitudinal narrow groove 20 is in a range from 0.60 to 0.80 times a width W6 in the tyre axial direction of the shoulder land portion 8.

Each of the shoulder land portions 8 according to the present embodiment is further provided with a plurality of shoulder lateral grooves 24 and a plurality of shoulder sipes 25. The shoulder lateral grooves 24 and the shoulder sipes 25, for example, are inclined with respect to the tyre axial direction in an opposite direction to an inclination direction of the crown lateral grooves 10.

In each shoulder land portion 8, the shoulder lateral grooves 24, for example, extend from the tread edge Te toward the shoulder main groove 4 and terminate within the shoulder land portion 8. In some preferred embodiments, the shoulder lateral grooves 24 terminate on the tread edge side with respect to the center location in the tyre axial direction of the shoulder land portion 8. In more preferred embodiments, the shoulder lateral grooves 24 has a groove width decreasing continuously toward the tyre equator C. Thus, the first land portion 21 tends to deflect suitably when driving, preventing snow clogging in the shoulder main grooves 4.

The shoulder sipes 25, for example, include first shoulder sipes 26, second shoulder sipes 27 and third shoulder sipes 28. The first shoulder sipes 26, for example, extend from the shoulder main groove 4 across the first land portion 21 and the longitudinal narrow groove 20, and terminate within the second land portion 22. The second shoulder sipes 27, for example, extend from the longitudinal narrow groove 20 toward the tread edge Te, and terminate within the second land portion 22. The third shoulder sipes 28, for example, extend from the tread edge Te and terminate within the second land portion 22. The shoulder sipes 25 configured as such can improve on-snow performance while maintaining sufficient stiffness of the shoulder land portion 8.

Preferably, the first shoulder sipes 26, for example, extend straight. Preferably, the second shoulder sipes 27 and the third shoulder sipes 28, for example, extend in a zigzag manner. Thus, block pieces divided by the first shoulder sipes 26 tend to deflect easily inwardly in the tyre axial direction by being pushed by the second land portion 22, preventing snow clogging in the shoulder main groove 4.

While the particularly preferred embodiments in accordance with the disclosure have been described in detail above, the present disclosure is not limited to the above embodiments but can be modified and carried out in various aspects within the scope of the disclosure.

EXAMPLE

Tyres, 235/65R16C, having a basic pattern of FIG. 1 were prototyped based on the specification shown in Table 1. As a comparative example, a tyre provided with crown lateral grooves (a) having a cross-section shown in FIG. 6 was also prototyped. The crown lateral grooves (a) of the comparative example each include a main portion (b) and a sipe portion (c) provided on the center location in a width direction of the main portion (b). Note that the comparative example tyre has the same tread pattern as the tread pattern shown in FIG. 1, except for the above-mentioned structure. Then, on-snow performance and wear resistance of each test tyre was tested. The common specification are as follows:
  rim: 16×7.0;
  tyre inner pressure: 420 kPa;
  test vehicle: front wheel drive car having displacement of
    2500 cc; and
  tyre locations: all wheels.
The test procedure are as follows.
On-Snow Performance Test:
  The acceleration was measured when the test vehicle accelerated from 8 km/h to 32 km/h on a snowy road. The test results are indicated in Table 1 using an index where the acceleration of the comparative example set to 100. The larger the value indicates the better the on-snow performance.
Wear Resistance Test:
  The wear energy of the crown land portion of each test tyre was measured using a wear energy measuring device. The test results are indicated in Table 1 using an index where the wear energy of the comparative example is set to 100. The smaller the value indicates the better the wear resistance.
Table 1 shows the test results.

TABLE 1

Figure 6:
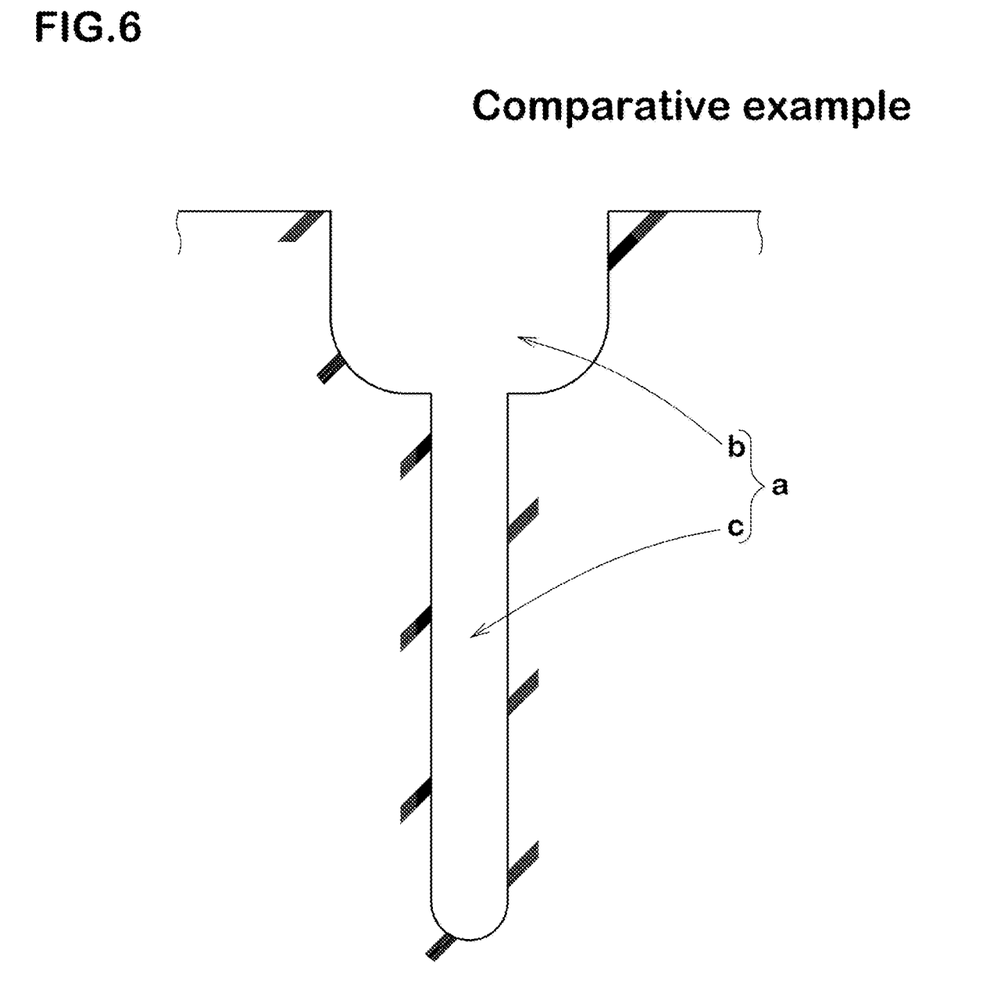
FIG. 6 is a cross-sectional view of a crown lateral grooves in accordance with a comparative example.

| | Ref. | Ex. 1 | Ex. 2 | Ex. 3 | Ex. 4 | Ex. 5 | Ex. 6 | Ex. 7 |
|---|---|---|---|---|---|---|---|---|
| Crown lateral groove cross-sectional view | FIG. 6 | FIG. 3 | FIG. 3 | FIG. 3 | FIG. 3 | FIG. 3 | FIG. 3 | FIG. 3 |

TABLE 1-continued

|  | | | | | | | | |
|---|---|---|---|---|---|---|---|---|
| Main portion opening widths W3/crown lateral groove widths W1 | 0.65 | 0.65 | 0.50 | 0.60 | 0.70 | 0.80 | 0.65 | 0.65 |
| Sipe portion widths W4 (mm) | 1.0 | 1.0 | 1.0 | 1.0 | 1.0 | 1.0 | 0.5 | 0.8 |
| Crown lateral groove depths d2/crown main groove depth | 0.90 | 0.90 | 0.90 | 0.90 | 0.90 | 0.90 | 0.90 | 0.90 |
| Partial tie-bars | presence | presence | presence | presence | presence | presence | presence | presence |
| On-snow performance (index) | 100 | 107 | 105 | 107 | 108 | 110 | 104 | 106 |
| Wear resistance (index) | 100 | 98 | 97 | 98 | 100 | 101 | 97 | 97 |

|  | Ex. 8 | Ex. 9 | Ex. 10 | Ex. 11 | Ex. 12 | Ex. 13 | Ex. 14 |
|---|---|---|---|---|---|---|---|
| Crown lateral groove cross-sectional view | FIG. 3 | FIG. 3 | FIG. 3 | FIG. 3 | FIG. 3 | FIG. 3 | FIG. 3 |
| Main portion opening widths W3/crown lateral groove widths W1 | 0.65 | 0.65 | 0.65 | 0.65 | 0.65 | 0.65 | 0.65 |
| Sipe portion widths W4 (mm) | 1.2 | 1.5 | 1.0 | 1.0 | 1.0 | 1.0 | 1.0 |
| Crown lateral groove depths d2/crown main groove depth | 0.90 | 0.90 | 0.70 | 0.80 | 1.00 | 1.10 | 0.90 |
| Partial tie-bars | presence | presence | presence | presence | presence | presence | none |
| On-snow performance (index) | 107 | 108 | 105 | 107 | 107 | 108 | 105 |
| Wear resistance (index) | 98 | 101 | 98 | 98 | 98 | 103 | 98 |

As a result of the test, it is confirmed that the example tyres improve on-snow performance while maintaining wear resistance compared with the comparative example tyre. In other words, it is confirmed that the tyres of the example can exhibit excellent on-snow performance while preventing a decrease in wear resistance.

What is claimed is:

1. A tyre comprising:
   a tread portion comprising at least one crown land portion defined between two main grooves extending continuously in a tyre circumferential direction,
   the at least one crown land portion being provided with crown lateral grooves traversing the at least one crown land portion,
   each of the crown lateral grooves, in a cross-sectional view perpendicular to its longitudinal direction, comprising a sipe portion having a width equal to or less than 1.5 mm, and a main portion connected to the sipe portion and opening at a ground contact surface of the at least one crown land portion, wherein
   the main portion has a width enlarging from the sipe portion,
   the main portion has a depth smaller than depths of the main grooves, and
   the sipe portion has a first wall extending in a tyre radial direction so as to be continuous with a first wall of the main portion to form a single groove wall together, wherein
   the at least one crown land portion comprises two crown land portions,
   one of the crown land portions is provided with the crown lateral grooves each having the sipe portion on a first side in the tyre circumferential direction with respect to a groove centerline thereof, and
   the other one of the crown land portions is provided with the crown lateral grooves each having the sipe portion on a second side opposite the first side in the tyre circumferential direction with respect to a groove centerline thereof.

2. The tyre according to claim 1, wherein
   the main grooves comprise a crown main groove located on a tyre equator side with respect to the at least one crown land portion,
   the crown main groove comprises first groove elements inclined with respect to the tyre circumferential direction, and second groove elements inclined with respect to the tyre circumferential direction at a greater angle than that of the first groove elements, and
   the first groove elements and the second groove elements are alternated in the tyre circumferential direction.

3. The tyre according to claim 2, wherein
   the crown lateral grooves are connected to the respective second groove elements.

4. The tyre according to claim 3, wherein
   the first wall of the main portion of each of the crown lateral grooves is connected to a groove wall of a respective one of the second groove elements, and
   the first wall of the main portion of each of the crown lateral grooves, with respect to the tyre axial direction, extends at a different angle from an angle of a respective one of the second groove elements.

5. The tyre according to claim 2, wherein
   the crown main groove is provided with partial tie-bars in which bottoms thereof raise partially,
   the partial tie-bars are connected to the at least one crown land portion, and
   the partial tie-bars are provided on end portions in the tyre circumferential direction of the respective first groove elements.

6. The tyre according to claim 5, wherein
the at least one crown land portion is provided with crown sipes extending from the crown main groove, and
a minimum distance between a respective one of the partial tie-bars and a respective one of the crown sipes which are adjacent with one another, in a plan view of the tread portion, is equal to or less than 2.0 mm.

7. The tyre according to claim 2, wherein
a maximum depth of the crown lateral grooves is in a range of from 0.80 to 1.00 times a depth of the crown main groove.

8. The tyre according to claim 1, wherein
the crown lateral grooves extend its entire length in a straight manner.

9. The tyre according to claim 4, wherein
in a tread plan view, the crown lateral grooves, with respect to the tyre axial direction, are inclined in an opposite direction to a direction of each of the second groove elements.

10. The tyre according to claim 9, wherein
an angle of each of crown lateral grooves is in a range from 15 to 25 degrees with respect to the tyre axial direction.

11. The tyre according to claim 2, wherein
a depth of the main portion is in a range from 0.25 to 0.60 times a depth of the crown main groove.

12. The tyre according to claim 11, wherein
a maximum depth of each of the crown lateral grooves is in a range from 0.70 to 1.10 times the depth of the crown main groove.

13. The tyre according to claim 2, wherein
the crown main groove is provided with partial tie-bars in which bottoms thereof raise partially,
the partial tie-bars are connected to the at least one crown land portion, and
the partial tie-bars are provided in a staggered manner such that the partial tie-bars, in the tyre circumferential direction, appear alternatively either side of groove walls of the crown main groove.

14. The tyre according to claim 5, wherein
widths of the respective partial tie-bars measured parallel to a width direction of the first groove elements are in a range from 0.20 to 0.40 times a groove width of the crown main groove.

15. The tyre according to claim 13, wherein
widths of the respective partial tie-bars measured parallel to a width direction of the first groove elements are in a range from 0.20 to 0.40 times a groove width of the crown main groove.

16. The tyre according to claim 13, wherein
each of the partial tie-bars has a maximum length measured along a longitudinal direction of the respective one of the first groove elements, and the maximum length is greater than the groove width of the crown main groove.

17. The tyre according to claim 16, wherein
the maximum length of each of the partial tie-bars is in a range from 0.10 to 0.50 times a length of the respective one of the first groove elements.

18. The tyre according to claim 13, wherein
the at least one crown land portion is provided with crown sipes extending from corners formed between the at least one crown land portion and the respective partial tie-bars.

* * * * *